United States Patent [19]

Martin

[11] Patent Number: 4,937,918
[45] Date of Patent: Jul. 3, 1990

[54] INLINE BREAST DEBONER

[75] Inventor: Eugene G. Martin, New Holland, Pa.

[73] Assignee: Foodcraft Equipment Company, Lancaster, Pa.

[21] Appl. No.: 224,633

[22] Filed: Jul. 27, 1988

Related U.S. Application Data

[63] Continuation-in-part of Ser. No. 200,165, May 31, 1988, abandoned.

[51] Int. Cl.⁵ .............................................. A22C 21/00
[52] U.S. Cl. .............................................. 17/11; 17/46
[58] Field of Search ................................ 17/11, 46, 52

[56] References Cited

U.S. PATENT DOCUMENTS

| | | | |
|---|---|---|---|
| 3,639,945 | 2/1972 | Duncan et al. | 17/52 |
| 4,306,335 | 12/1981 | Hawk et al. | 17/52 |
| 4,477,942 | 10/1984 | Martin et al. | 17/52 |
| 4,564,976 | 1/1986 | Beech et al. | 17/46 |
| 4,593,435 | 6/1986 | Martin et al. | 17/52 |
| 4,597,136 | 7/1986 | Hazenbroek | 17/52 |
| 4,619,017 | 10/1986 | Simmons | 17/11 |
| 4,648,155 | 3/1987 | Burnett | 17/46 |
| 4,651,383 | 3/1989 | Van Der Eerden | 17/12 |
| 4,780,930 | 1/1988 | Sparkia | 17/11 |

Primary Examiner—Willis Little
Attorney, Agent, or Firm—Hoffman, Wasson, Fallow & Gitler

[57] ABSTRACT

A method and apparatus for producing boneless chicken breasts maximizes the amount of meat retained by the breast when the wing is removed from the breast, by permitting the wing to rotate with respect to the breast as the final wing cut is made while the breast and wing are maintained in tension. The apparatus automatically debones the breasts and performs the wings cuts, on a continuous series of chicken front halves.

18 Claims, 8 Drawing Sheets

INLINE BREAST DEBONER

This application is a continuation-in-part of copending application Ser. No. 200,185 filed May 31, 1988, on abandoned.

BACKGROUND OF THE INVENTION

1. Field of the Invention

This invention relates to the art of butchering, and particularly to a method of producing boneless breasts and an apparatus for carrying out the method.

2. Description of the Prior Art

All known methods and apparatus for separating the wings from the breast allow a considerable portion of the shoulder muscle to remain attached to the wing. Inasmuch as boneless breasts sell for several times the per-pound price of wings, it is desirable to cut the wings from the breasts in a way that maximizes the amount of meat remaining on the breast. This must be done without creating bone chips or otherwise increasing the rejection rate of the breasts. Known prior inventions do not address this problem.

SUMMARY OF THE INVENTION

It has been discovered that the mass of breast meat can be maximized by maintaining the wing of a bird under tension with respect to the breast, while allowing it to pivot or rotate with respect to the breast, as the wing is severed from the breast.

It is therefore an object of the invention to provide an improved method and apparatus for producing boneless chicken breasts. It is also an object of the invention to produce increased average yields by minimizing the amount of meat left at the shoulder joint of the wing as it is removed.

The invention includes a method of producing boneless chicken breasts from a chicken upper half, comprising steps of mounting the upper half on a fixture, neck uppermost, then making a preliminary cut downward into each shoulder joint so as to sever the ligaments therein, tearing the breasts and wings from the carcass, then restraining the wings against translation with respect to the breasts, without preventing the wings from rotating, and then cutting the wings from the breasts at the location of the shoulder joints, while rotating the wings, so as to maximize the amount of meat remaining with the breast.

The invention also provides an apparatus for producing boneless chicken breasts, comprising a first endless conveyor for transporting chicken upper half, said first conveyor comprising a flexible belt supporting at intervals outwardly protruding fixtures each adapted to support a chicken upper half, a second conveyor for restraining the wings of birds on said first conveyor, and for tearing the wing and breast assembly away from the carcass, and means for cutting the wings from the deboned breasts, the cutting means comprising a cutting knife edge and means for rotating the wings with respect to the breasts during the cutting operation.

BRIEF DESCRIPTION OF THE DRAWINGS

In the accompanying drawings.

DESCRIPTION OF THE PREFERRED EMBODIMENT

Figure 1:
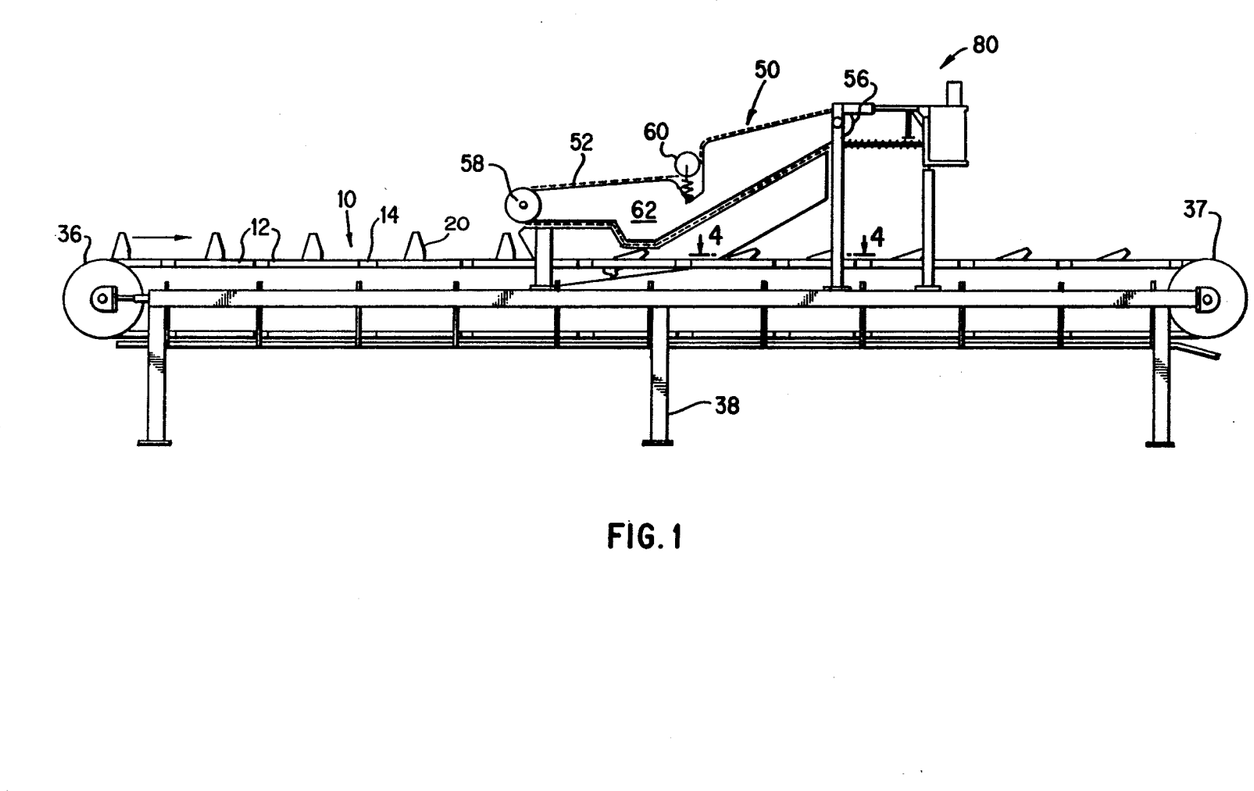
FIG. 1 is a side elevation of an apparatus embodying the invention.
Figure 2:
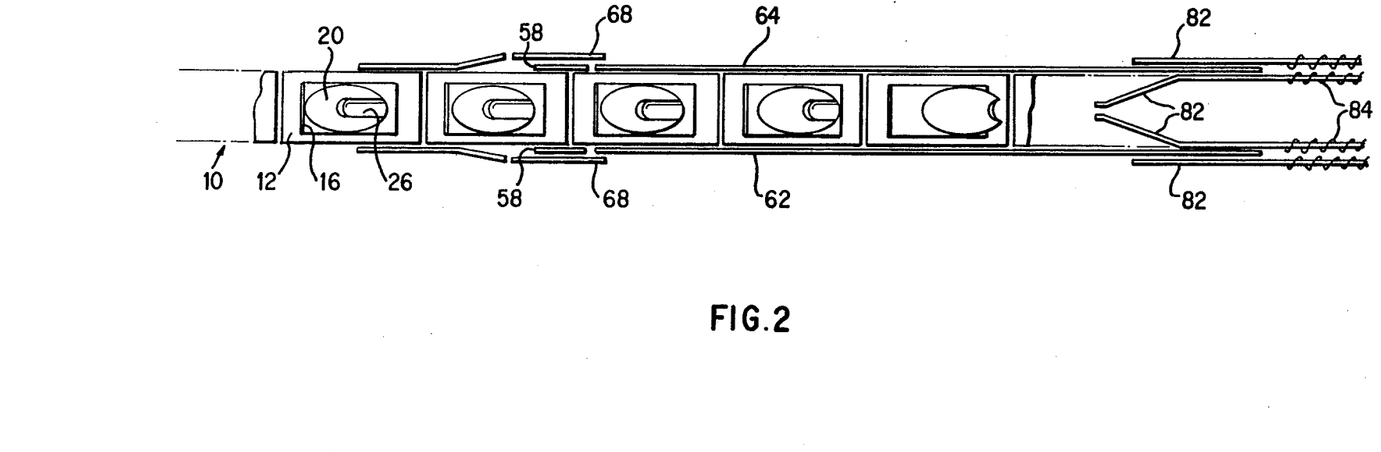
FIG. 2 is a top elevation thereof.

Referring to FIGS. 1-2, an apparatus embodying the invention comprises a first conveyor 10 including an endless loop of metal plates 12 flexibly linked to one another by a pair of No. 80 conveyor chains 14 running on standard sprockets. Every other plate has a rectangular aperture 16 therein through which protudes the nose 18 of a carcass fixture 20 (FIG. 3), mounted for pivoting movement on a horizontal shaft 22 extending between links of the spaced chains. The chains and fixtures follow a horizontal linear path defined by the upper surface of a frame 24.

Figure 3:
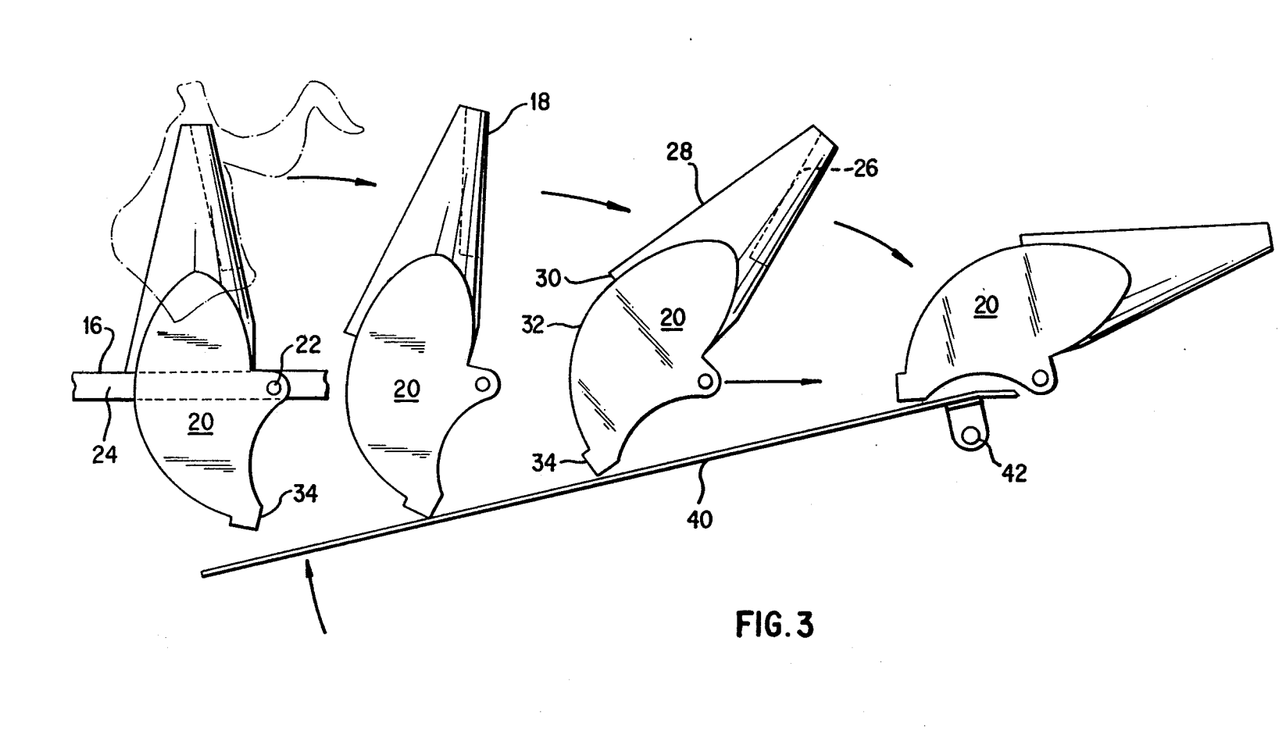
FIG. 3 is a detail of a carcass fixture, showing successive positions thereof.

The fixture nose 18 is generally conical, and has a rounded groove 26 in its forward face, designed to engage the neck and backbone of a front half (breast, back, wings) of a bird placed on the fixture with its back facing the direction of movement. The near face 28 of each fixture nose is provided with stop shoulder 30 for limiting rearward pivoting of the nose. The bottom end of the fixture opposite the nose, on the opposite side of the plate, has a radiused periphery 32 terminating at a protrusion 34 that both limits the forward pivoting motion of the fixture, and also acts as a cam follower when engaged by a stationary cam described below.

An adjustable stationary ramp or cam 40 (FIG. 3) is placed beneath the upper run of the first conveyor, in a position which interferes with the protrusion 34 of each fixture 20, thus to cause the fixture to tip forward at that point. The downstream end of the cam 40 is pivotally attached to the frame 24 at 42; the elevation of the upstream end cam be adjusted by means, not shown, to vary the angle of inclination of the cam.

A second endless conveyor 50, running in synchronization with the first, and at the same speed thereas, is located above the first conveyor, as shown in FIG. 1. The second conveyor comprises a pair of identical chains 52, each running on a driven sprocket 58, and a resiliently biased tension wheel 60. The chains are guided around an irregular path defined by the edges of plastic walls 62, which also serve to confine the body of the bird. Each link of each chain has a series of protruding tabs 66 extending in the plane of the chain, on both lateral sides thereof, inwardly and outwardly in regular repeating groups. These tabs serve to retain the chains on their guides, and also act as pushers for the wings once the wing and breast assembly has been peeled from the carcass. There are not any flights extending between the spaced chains.

Figure 5:
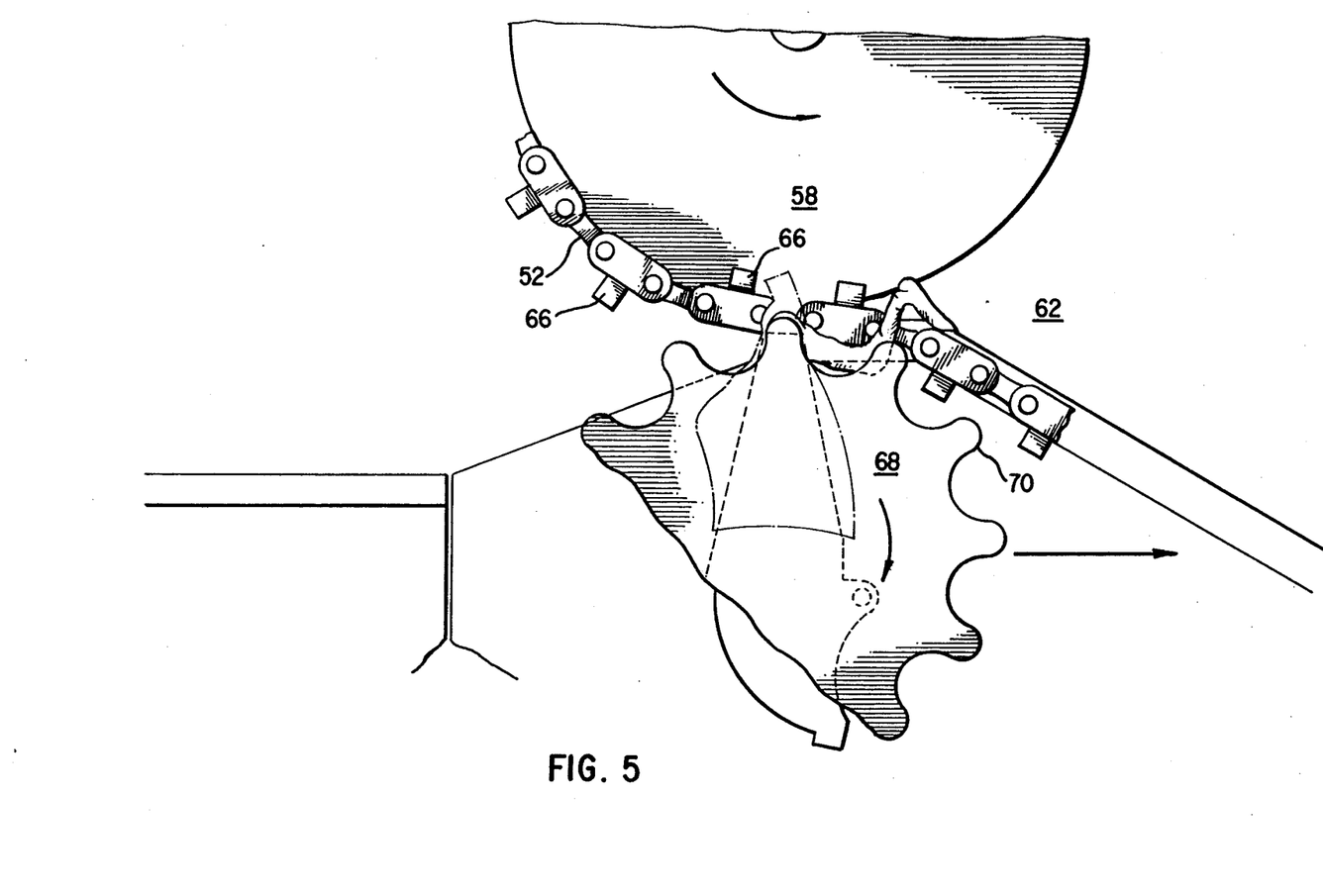
FIG. 5 is a detailed view, partially broken away, of a wing indexing mechanism.

At the upstreams, freewheeling, end of the second conveyor, the drive sprockets 58 are linked to a pair of spaced indexing sprockets 68, each having ten rounded protuberances 70 thereon, as shown in FIG. 5, for capturing the wings of each bird and positioning them between the more widely separated sets of inwardly facing ears. These sprockets rotate in synchronization with the second conveyor.

Figure 4:
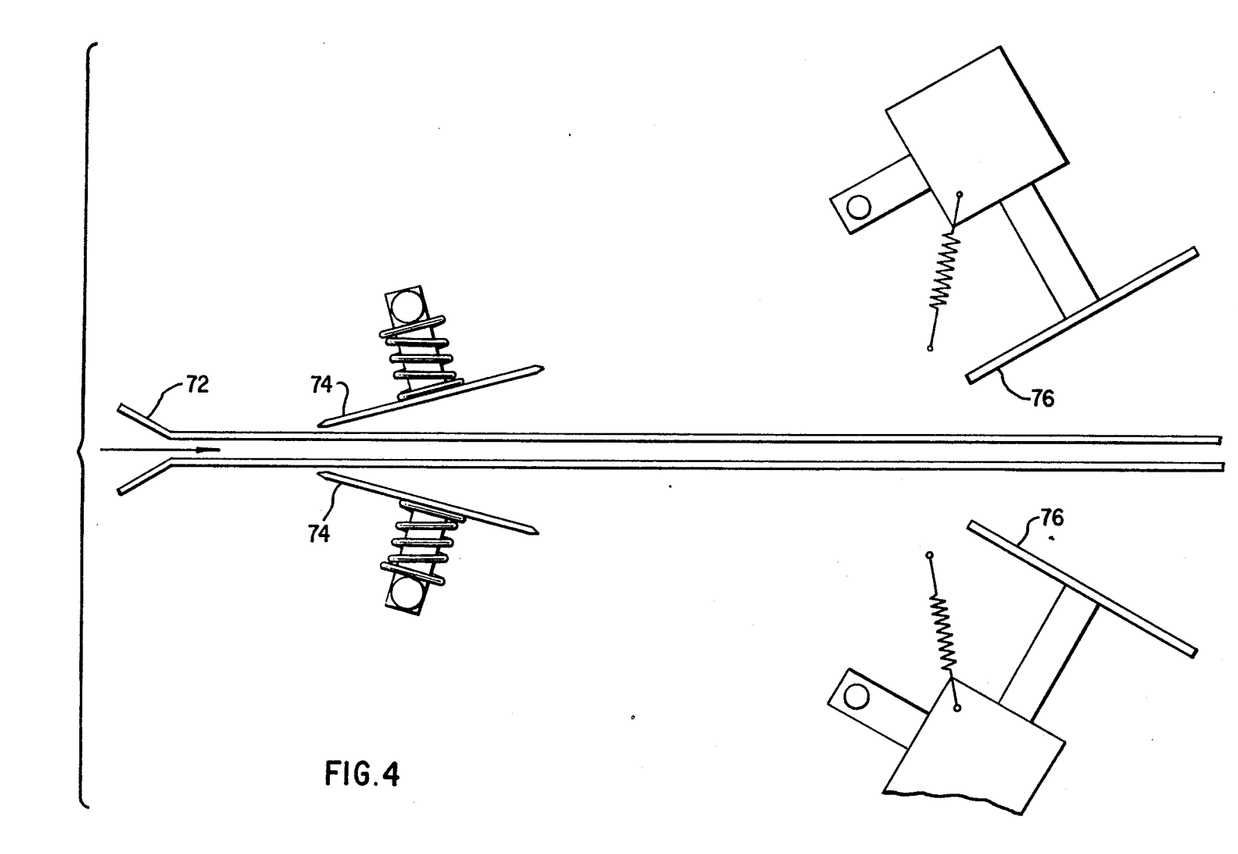
FIG. 4 is a sectional view taken along the line 4—4 in FIG. 1.

Referring to FIG. 4, downstream of the point of which the breasts are peeled from the carcass, and just above the first conveyor, there are, in series: a Vee-shaped keel aligner 72, a pair of freewheeling rotary blades 74 for cutting membranes that attach the tenders to the keel, and a pair of freewheeling squared edged disks 76 for pushing the tenders away from the carcass. The rotary blades and the disks are each mounted on axes that extend away from the center of the apparatus downward and rearward, with respect to the direction of product movement, at slight oblique angles. Each blade and each disk is spring loaded toward the vertical center plane of the apparatus.

Figure 6:
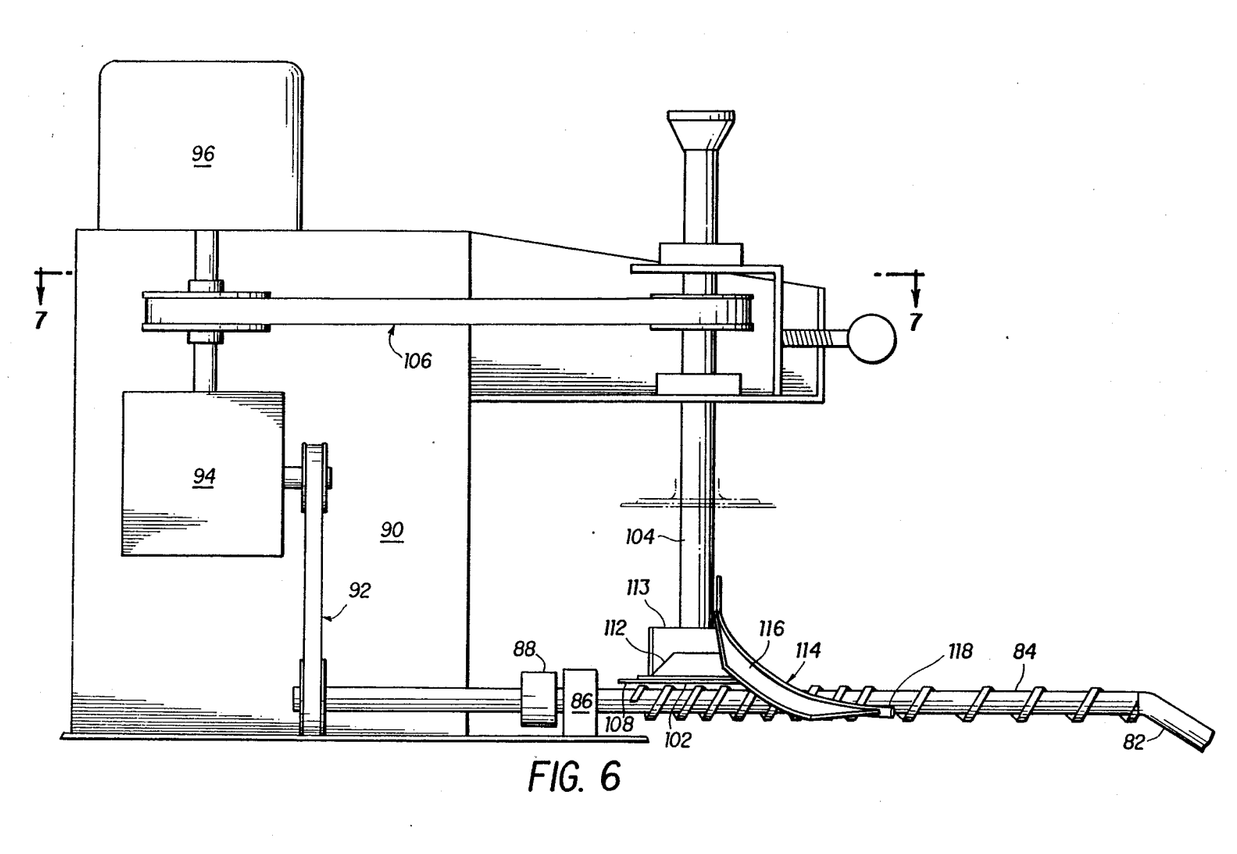
FIG. 6 is a side elevation of a device for severing wings from breasts.
Figure 7:
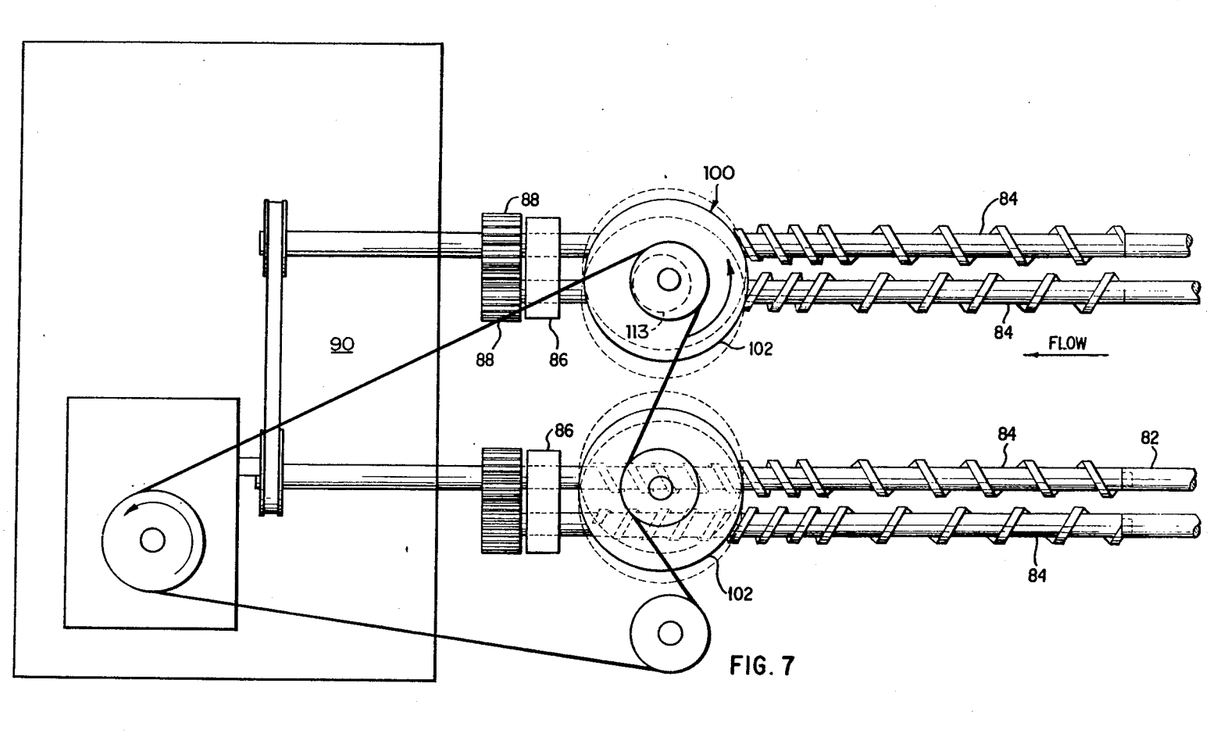
FIG. 7 is a view taken along the line 7—7 in FIG. 6.
Figure 8:
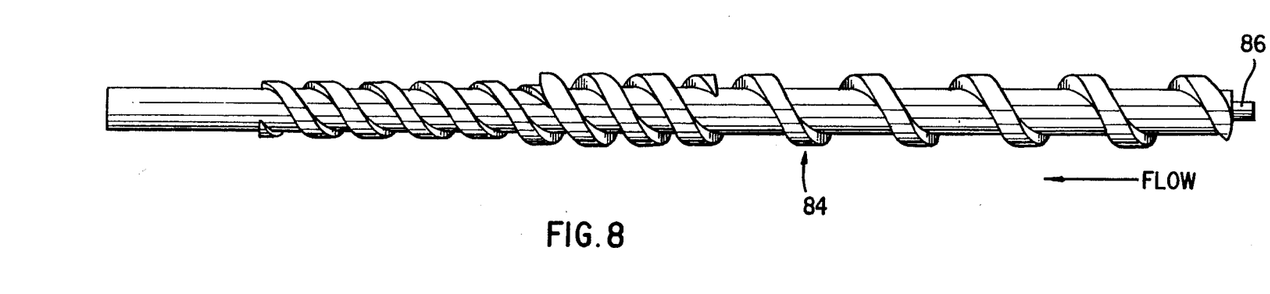
FIG. 8 is a detail view of an auger shown in FIG. 7.

The upper conveyor's lower run is defined by the edges of the product-confining walls 62, as mentioned above. As shown in FIG. 1, the chain path follows a first horizontal segment, a downward incline, a second horizontal segment (it is here that the breast filets are removed from the carcass—see below), and finally an upward incline to the wing cutting device 80. En route to the wing cutter, spaced pairs of guide rods 82 (FIG. 2) engage and confine the wings at the shoulder joints, as the breast/wing assembly is advanced by the upper conveyor. The guide rods approach the center plane of the apparatus at their upstream end, so as to engage properly even misaligned birds. The downstream end of each guide rod rotatably supports one end of a horizontal auger 84, as shown in FIGS. 6-8. The downstream end of each auger is rotatably supported by a bearing 86, through which the auger shaft protrudes. A gear 88 is affixed to each protruding shaft, and adjacent gears are in mesh with one another, so that the augers in each pair rotate in opposite directions. The shaft of one auger of each pair extends through its support bearing into a transfer case 90, where it is driven by a timing belt drive 92 from the output shaft of a 10:1 ratio right-angle gearbox 94 whose input shaft is driven by an electric motor 96 atop the transfer case.

FIG. 8 shows one of the augers 84 in detail. Each auger has helical flutes, either right- or left-handed, as mentioned above, extending along its shaft. While the helix angle of the flutes remains constant, their diameter varies along their length as shown. Also, the upstream end of the auger is single-fluted, while the downstream end is double-fluted. It can be seen that the fluting is most aggressive just upstream of the rotary knives (see below), and that the reduction in flute diameter provides clearance for the knives.

Two rotary knives 100 are positioned just above the augers, one for each set. Each knife comprises a circular blade 102 attached at the bottom end of a vertical driveshaft 104, FIG. 6, each such driveshaft being connected to the motor 96 by a means of a timing belt 106 toothed on both sides; opposite sides of the belt engage pulleys affixed on the driveshafts 104, so that the blades 102 rotate in opposite directions. The direction of rotation is such that the leading edges of the two blades move outward, or away from each other. This is critical to the wing cut, as described below.

Figure 9:
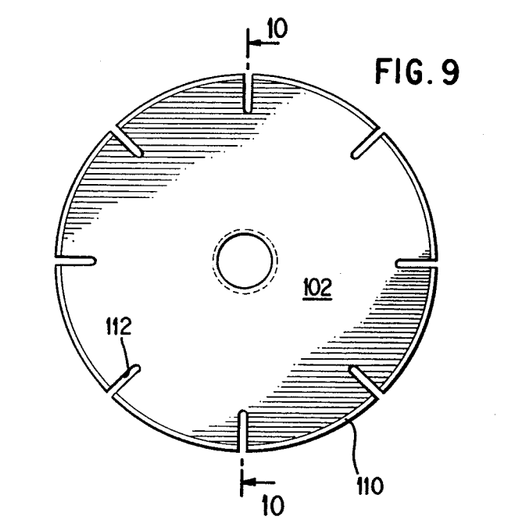
FIG. 9 is a detail view of a rotary knife shown in FIG. 6.
Figure 10:
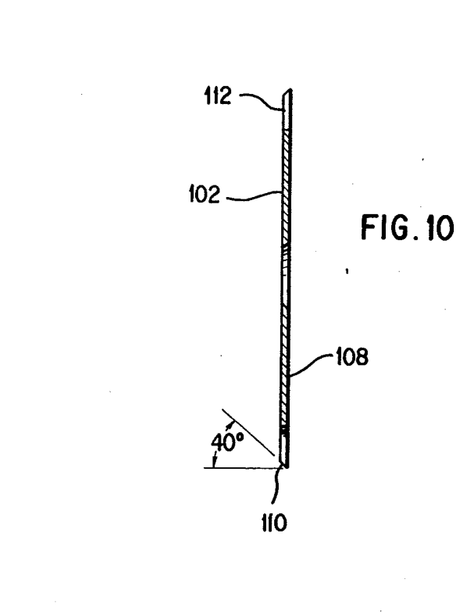
FIG. 10 is a sectional view taken along the line 10—10 in FIG. 9.

Each blade 102 has a planar bottom surface 108 and a beveled periphery 110 making an angle, preferably, of about 40° with respect to the bottom surface. Therefore, the periphery of each blade constitutes a frustoconical surface having a 50° apex angle. Each blade further has a plurality of circumferentially spaced radially extending slots 111 interrupting the peripheral surface. The purpose of these slots is to provide sharp corners for cutting through difficult tissue, and to provide sharp cutting edges even when the knife edges have lost some of their sharpness.

To clear material from the blades, each is provided with a frustoconical hub 112 with an eccentric cam 113 mounted thereon.

A pair of wing loops 114 are adjustably attached to the apparatus so as to extend along the outboard sides of the augers in the vicinity of the rotary knives. Each loop comprises an upwardly convex curved blade 116 having an enlarged rounded bead 118 running along its inner surface. The blades taper down to the beads at their upstream ends. As the purpose of the loops is to assist the desirable turning of the wings during the cutting step, their adjustability allows the operator to correct their action depending upon the type and size of the birds involved.

In operation, the processing apparatus is set in motion, so that the cones or fixtures 20 are driven in the direction of the arrow in FIG. 1. The front half (unboned breast with back and wings attached) of a bird is firmly placed upon the fixture, with the back of the bird facing in the direction of movement of the fixture (i.e., downstream). An initial cut is made manually into each shoulder joint to separate the breast and wing bones. The fixture then moves the bird in the downstream direction, through a safety gate, which excludes workers' hands and other objects. Shortly thereafter, the bird, passing between the lateral walls which closely confine it, encounters the unequally spaced protruding tabs 66 of the upper conveyor chain; the lobes on the sprockets 68 at the entry point index the bird so that the wings rest properly between the more widely spaced tabs. Now the birds are supported not only by the cone fixture from the inside, but also by the wings, which are kept over the edges of the walls 62, between the tabs 66 of the conveyor chains.

Initially, the wings are not in tension. Presently, however, the protrusion 34 at the bottom of the fixture upon which the bird is mounted is engaged by the sloping cam 40 beneath the first conveyor, and the fixture 20 is forced to tip forward about its pivot rod 22, from a substantially vertical position to a substantially horizontal one. Inasmuch as the carcass of the bird is firmly positioned on the fixture, the rib cage of the bird is forced to move with the fixture. The wings, however, remain captured between the upper conveyor and the lateral walls. Initially, the path of the upper conveyor descends to follow the carcass, but soon, it diverges upward. Despite the fact that the shoulder joints have previously been partially severed, the strength of the tissues joining the wings to the breast meat is adequate to separate the breast filets (pectoralis major) from the carcass. The combination of the two motions—the cone tipping and the upward pull on the captured wings—creates a tension which gently separates the membrane holding the fillets from the rib cage. This gradual application of tension maximizes yield by reducing tissue tearing, and also reduces carcass breakage.

Now, the boneless, interconnected breast filets, with the wings still attached, follow the upper conveyor, while the carcass remains with the lower conveyor. As the carcass proceeds further, the tenders (or tenderloins, pectoralis minor), which remain on the top of the carcass, as they do not tear off with the breast filets, are engaged by the rotary blades 74, described above, which sever the membranes holding the tenders to the carcass. Thereafter, the tenders are engaged by the square-edged discs 76 which tend to plow the tenders away from the carcass, facilitating manual removal of the tenders subsequently.

Meanwhile, the deboned whole breasts, with wings attached, have been carried by the upper conveyor to the wing removing device 80 shown in detail in FIGS. 6–7. As the breasts, now moved solely by the tabs 66 of the upper conveyor chains engaged behind the shoulders, approach the upper end of the incline, the pairs of diverging stainless rods engage the wings near the shoulders. At the top of the incline, the rods transfer the product to the two pairs of counterrotating augers 84, which at first primarily convey the product, and then, as the flutes grow larger, apply a downward pull to the flesh of the breasts just adjacent the shoulder joints.

The wings are still free to rotate with respect to the breasts, and in fact do tend to pivot upward as the joining tissues are severed from the back side of the breast toward the front thereof by the outwardly moving leading edges of the rotating knives. The tendency of the wings to pivot is encouraged by the action of the arcuate wing loops; thus the cutting is attended by a pivoting movement of the wings toward the front of the breast, which movement has been found not only to produce clean cuts at the leading and trailing portions of the shoulder muscle, but also to increase substantially the mass of shoulder meat that remains with the breast.

Inasmuch as the foregoing description and the drawings described only one embodiment of the invention, which may be subject to variation and changes in detail, the emodidment described should be regarded only as illustrative of the invention defined by the following claims.

I claim:

1. A method of cutting a chicken wing from its breast comprising steps of
    making an initial cut downward through the shoulder muscle of the bird and through the shoulder joint to sever the ligaments of thereof,
    restraining the wing from translation, without preventing it from rotating, with respect to the breast,
    pulling on the breast so as to create, between the wing and the breast, a tension insufficient to tear the wing from the breast, and then
    making a final cut through said tissues, to separate the wing from the breast, while permitting the wing to rotate freely with respect to the breast.

2. The method of claim 1, wherein the final cut is made from the back of the breast toward the front.

3. The method of claim 1, wherein the final cut is made with a knife edge, the motion of the knife edge being away from the sternum.

4. A method of butchering front halves of a series of birds, comprising steps of
    mounting each of said halves on one of a series of substantially vertical fixtures, with each of said halves being oriented with the neck of the bird up,
    cutting downward through the shoulder joints to separate the wing bones from those of the breasts, without severing the wings from the breasts,
    moving said fixtures in the direction of the back of the bird, then
    vertically restraining the wings of the bird while rotating the fixture forward with respect to its direction of movement, so as to lower the breasts of the bird with respect to the wings and thereby separate the breasts from the carcass, and then cutting the wings completely from the breasts.

5. The method of claim 4, wherein the wings are restrained but are allowed to rotate with respect to the breasts as they are cut therefrom, the wings being maintained in tension with respect to the breasts as said cut is made.

6. The method of claim 5, further comprising a step of removing the tenders from the carcass after the breast meat has been peeled from the carcass.

7. A device for cutting a poultry wing from its breast, comprising
    means for restraining translatory movement of the wing without preventing rotational movement thereof, with respect to the breast,
    means for pulling said breast in a direction away from said wing, and
    means for cutting tissues joining said wing to said breast, said cutting means being operational concurrently with said pulling means.

8. The device of claim 8, wherein said restraining means comprises a pair of spaced parallel elongate members adapted to permit the shoulder of the bird to pass therebetween with the wing on one side thereof and the breast on the other side.

9. A device for cutting a poultry wing from its breast, comprising
    means for restraining translatory movement of the wing without preventing rotational movement thereof with respect to the breast, and for pulling said breast in a direction away from said wing, and
    means for cutting tissues interconnecting the wing and breast, said cutting means being operational concurrently with said pulling means,
    wherein said restraining an pulling means comprises a pair of spaced, parallel, rotatable, elongate members adapted to permit the shoulder of the bird to pass therebetween with the wing on one side thereof and the breast on the other side,
    wherein said members have helical flutes thereon, and further comprising means for rotating said members in opposite directions in such a direction as to pull the breast away from the wing.

10. The device of claim 9, wherein the flutes on the two members are of opposite hand, so as to mesh as the members are counterrotated, whereby the members may act as a conveyor to move the breasts lengthwise of and between the members.

11. The device of claim 10, wherein the flutes vary in diameter along the length of the members.

12. The device of claim 10, wherein said cutting means comprises a knife positioned adjacent said members.

13. The device of claim 12, wherein said knife is a rotary knife comprising a disc having a beveled peripheral surface.

14. The device of claim 13, wherein said peripheral surface defines the frustum of a cone having an apex angle of about 50°.

15. The device of claim 14, wherein said knife has a plurality of circumferentially spaced radially extending slots therein interrupting said periphery surface.

16. The device of claim 13, wherein said rotary knife has an upper surface, and further comprising a frusto-conical hub attached to said upper surface, a driveshaft connected to said hub, and an eccentric member mounted on said shaft atop said hub, for ejecting material from said knife edge.

17. The invention of claim 13, further comprising an arcuate loop placed in the path of the wings in the vicinity of the knife, to assist the wings in rotating as the cut is made.

18. The invention of claim 17, further comprising adjustable mounting means for the loop, to permit the position of the loop to be altered with respect to the knife.

* * * * *